United States Patent [19]

Liu

[11] 4,417,489
[45] Nov. 29, 1983

[54] METHOD AND APPARATUS FOR MACHINING A WORKPIECE BY VARYING THE TOOL GEOMETRY

[76] Inventor: Chunghorng R. Liu, 212 Pawnee Dr., W. Lafayette, Ind. 47906

[21] Appl. No.: 106,150

[22] Filed: Dec. 21, 1979

[51] Int. Cl.³ .................. B23B 3/00; B23B 29/00
[52] U.S. Cl. .................................. 82/1 C; 82/36 R
[58] Field of Search .................. 82/1 C, 1 R, 36 R; 407/83

[56] References Cited

U.S. PATENT DOCUMENTS

| | | | |
|---|---|---|---|
| 2,160,369 | 5/1939 | Rikof | 407/83 |
| 3,125,798 | 3/1964 | Stein | 407/83 |
| 3,455,189 | 7/1969 | Sweet | 82/1 R |
| 3,559,259 | 2/1971 | Kumabe | 82/1 C |
| 3,562,477 | 2/1971 | Ronald | 82/1 R |
| 3,739,665 | 6/1973 | Kumabe | 82/1 R |
| 3,741,070 | 6/1973 | Berthiez | 82/1 C |
| 3,754,487 | 8/1973 | Nachtigal | 82/1 C |
| 3,807,257 | 4/1974 | Maropis | 82/1 C |
| 4,172,398 | 10/1979 | Asmanes | 82/36 R |

FOREIGN PATENT DOCUMENTS 904081 2/1945 France .......................... 407/83

OTHER PUBLICATIONS

Article-Bearing Lands and Negative Rakes Prolong Cutting Tool Life" by Mark W. Purser-from American Machinist Aug. 1945, pp. 118-121.

*Primary Examiner*—Harrison L. Hinson
*Attorney, Agent, or Firm*—Phillips, Moore, Weissenberger, Lempio & Majestic

[57] ABSTRACT

A method and apparatus for machining a workpiece to perform several functions including sensing tool wear, enhancing tool life, tool wear compensation, cutting a workpiece having two different materials joined at a boundry, and suppressing chatter, including placing a cutting tool having a rake face and a clearance face with a first clearance angle with respect to a workpiece and a second clearance face with a second clearance angle with respect thereto and with the first clearance angle being less than the second clearance angle and supporting the cutting tool in a rotatable tool holder having an axis of rotation with the cutting tool tip being aligned with the axis of rotation such that rotation of the holder varies the cutting tool geometry to perform the several functions.

27 Claims, 18 Drawing Figures

FIG_4A

FIG_5A

FIG_4B

FIG_5B

FIG_4C

FIG_5C

FIG_6

FIG_13A

FIG_13B

METHOD AND APPARATUS FOR MACHINING A WORKPIECE BY VARYING THE TOOL GEOMETRY

CROSS-REFERENCE TO RELATED APPLICATIONS

This application is related to application Ser. No. 824,530, filed Aug. 15, 1977, and entitled Tool Holder for Varying Tool Rake Angle, by Chunghorng R. Liu, et al. The latter application is incorporated by reference herein in its entirety for showing apparatus, in addition to those shown in this application, for carrying out the method of the present invention.

BACKGROUND OF THE INVENTION

1. Field of the Invention

This invention relates to methods and apparatus for machining a workpiece with a tool and, more particularly, to methods for varying the tool geometry to perform a number of functions including sensing tool wear, enhancing tool life, machining a workpiece of two different materials and suppressing chatter, and apparatus for carrying out these methods and for providing optimal tool geometries.

2. Background Art

In the mechanical processing of materials, the shape, size or properties of a given workpiece are altered. Those processes in which the size and shape are changed by removing material with a tool are known as machining or cutting. In practice, all operations such as turning, boring, drilling, milling, reaming, tapping and cutting fall into this single category of machining or cutting.

In the machining art, a given tool will have a number of surfaces or tool faces, each making a particular angle with respect to the cutting velocity of the workpiece when cutting the workpiece, and these angles specify what is known as the tool geometry. For example, a cutting tool normally has a face known as a rake face, and the angle that this face makes in relation to the cutting velocity is known as the rake angle. A good example of the entire tool geometry for a standard lathe tool is given in Metal Cutting Principles, by M.C. Shaw, the M.I.T. Press, 1968, Chapter 13, to which reference may be had for a better understanding of the prior art and the invention.

The significance of the tool geometry can be shown by the following. In the process of machining the workpiece, different tool geometries are preferred for different cutting conditions so that, for example, one tool geometry is recommended for machining an aluminum workpiece and a different tool geometry is recommended for machining steel. While there are tables describing representative rake and other angles of the tool geometry for machining workpieces of different materials, these angles are not necessarily optimal. For example, for machining a workpiece to a desired surface quality, the optimal angles used are influenced by the individual machining conditions such as the combination of tool material, lubricant, cutting speed, feed rate, and depth of cut, in addition to the workpiece material. Thus, in a finishing operation on a workpiece of a given material, where the depth of cut and feed rate are small, a significantly larger rake angle should be used than in other machining operations on the workpiece such as a roughing operation. The other angles of the tool geometry also would be different in the finishing operation for optimal machining.

In current machining practice, a tool having a particular geometry such as a specific rake face is fixed on a tool holder, whereby the rake angle is fixed and cannot be changed. If, for example, both roughing and finishing operations are to be performed on the workpiece, different tools having different rake faces should be used to provide different tool geometries for these different operations. This, of course, is disadvantageous in that a large number of different tools having different rake and other faces are required in inventory to provide different tool geometries, or additional time and expense are needed in regrinding a given tool face to meet the different tool geometry requirements for different machining operations. More importantly, the idle time associated with changing or regrinding the tool, i.e., the time during which the workpiece is not being cut, can be quite high. This idle time would be even higher if, for example, after a roughing operation, the workpiece were moved to another machine tool for a finishing operation.

The significance of the tool geometry is also exemplified by the following. With other cutting conditions being fixed, the tool geometry will affect the mechanics of chip formation and, therefore, will affect (1) the geometric and other properties of a machined surface and (2) the tool wear behavior and the tool life. The tool geometry will also affect the magnitude and direction of the cutting forces and the damping property of the cutting process; consequently, the tool geometry will influence the static deflection and dynamic stability of a machine tool-machining system.

For example, while cutting the workpiece with a fixed tool geometry, the tool will wear resulting in deviations in the outside or inside diameter of the cut workpiece for lathe cutting or for boring, respectively. One way to compensate this deviation is to move the tool carriage and hence the worn tool into the workpiece at the same rate as the tool wears. However, this can normally be done only by the complex technique of programming this movement into numerical control (NC) machines. Another shortcoming of this approach is that by continuing to cut with a worn tool rather than a sharp tool, the workpiece will experience extra thermal distortion which is difficult to account for. It therefore is desirable to easily determine when the tool has worn and take simple corrective action, if needed.

Also, for example, in boring a hole with a fixed tool geometry in a workpiece having at least two different materials connected at a boundary, problems are encountered which are not only related to the optimum tool geometry that is required for each workpiece material, but also to the vibrations that are induced by impact cutting when the cutting tool moves from one material to the other material of the workpiece. The impact, whose force will depend on the cutting forces which in turn are dependent on the tool geometry, will not only cause tool vibration which will thus reduce the dimensional accuracy of the bored hole, but also will place a limit on the machining speed and material removal rate. For a ceramic cutting tool, the impact may crack the tool and may ruin the workpiece. Still further, with a workpiece of a single material or different materials, what is known as chatter may be encountered while cutting the workpiece with a fixed tool geometry and this too will produce an undesirable surface on the cut workpiece.

In current machining practice, there is no satisfactory technique for performing various functions in the process of cutting a workpiece, such as roughing and finishing a workpiece with a single cutting tool, sensing tool wear, varying cutting forces in magnitude and direction as the tool moves from one material to another of a workpiece to reduce the vibration resulting from the impact, and suppressing chatter to, for example, improve the quality of the workpiece.

SUMMARY OF THE INVENTION

It is an object of the present invention to provide novel methods and apparatus for machining a workpiece.

Yet another object of the present invention is to perform a number of machining functions with a given tool, including improving the quality of the machined workpiece, sensing tool wear, enhancing tool life, and suppressing chatter.

A yet further object of the present invention is to perform these functions by manipulating the tool to change the tool geometry.

Another object of the present invention is to provide new cutting tools to perform such functions.

Still another object of the present invention is to provide methods and apparatus for machining a workpiece made of more than one material.

It is another object of the present invention to provide methods and apparatus for reducing the idle time in a machining process.

These and other objects of the present invention are obtained with a method of machining a workpiece with a cutting tool, including placing the tool in a tool holder, the tool then having a tool geometry with respect to the workpiece, cutting the workpiece with the tool in the tool holder, and varying the tool geometry to perform the functions of sensing tool wear, or enhancing tool life, or cutting a workpiece having two different materials, or suppressing chatter.

These and other objects of the present invention also are obtained with apparatus for boring a hole in a workpiece of two materials with a cutting tool providing a tool geometry with respect to the workpiece, including a rotatable tool holder for supporting the tool and having an axis of rotation which extends through the cutting tip, a rotatable shaft for rotatably supporting the tool holder and being rotatable about an axis to rotate the tool holder to bore the hole, and means for rotating the tool holder about the axis of the tool holder to vary the tool geometry.

Other apparatus for machining a workpiece includes a rotatable cutting tool that is supported on a tool holder and has a plurality of cutting tips positioned on a circle centered on the axis of rotation of tool. Also included in this invention is a cutting tool having a rake face, and a clearance face providing a first clearance face being constructed to make a first clearance angle with a workpiece and a second clearance face being constructed to make a second clearance angle with the workpiece, the first angle being less than the second angle.

DETAILED DESCRIPTION OF THE PREFERRED EMBODIMENTS

While the invention will be described in relation to the machining operation of cutting with lathe and boring tools, the principles of the invention apply equally to other material removing processes which may be classified generically as cutting, such as drilling and milling.

Throughout this disclosure, various methods and apparatus will be described in which the tool geometry is changed to perform a number of functions or objectives. One objective is to improve the quality of the machined workpiece, whether made of a single material or composite materials, by varying the tool geometry (1) to provide a proper surface finish, (2) to provide dimensional accuracy and uniformity, and (3) to reduce chatter marks. Another objective is to improve the life of the cutting tool and productivity by varying the tool geometry (1) to sense the tool wear and (2) to enhance the life of the tool. All of these objectives are obtained by sensing one or more cutting parameters, including (1) the cutting force, (2) the cutting temperature, (3) the cutting noise, (4) the electrical power driving the machining system, (5) the workpiece or cutting tool acceleration, i.e., vibration or (6) the deflection of the cutting tool or the deflection of the workpiece. The control of the tool geometry may be carried out manually or automatically.

Figures 1, 2, 3:
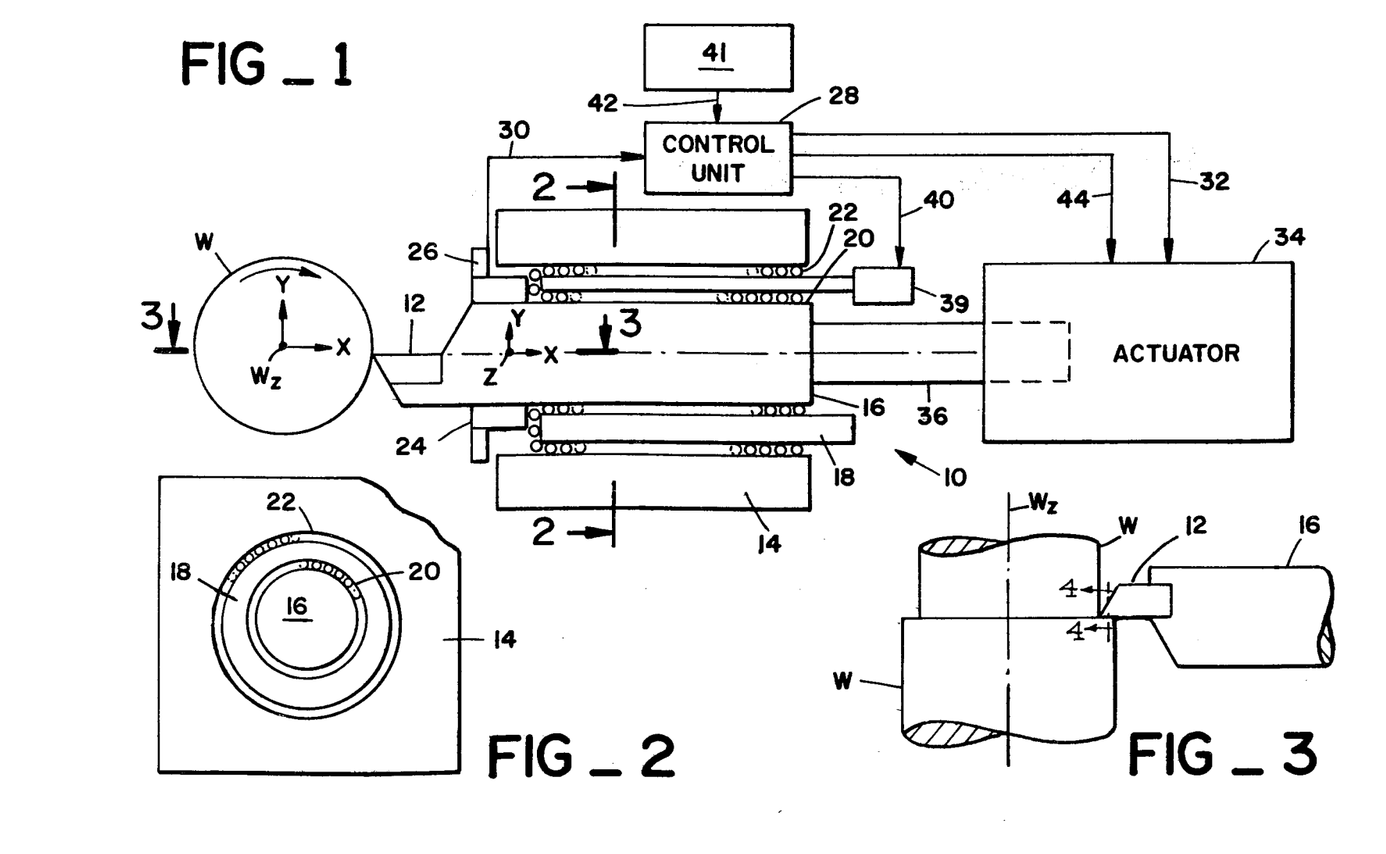
FIG. 1 is a side elevation, partially in section, of one embodiment of an apparatus for performing various machining functions.
FIG. 2 is a view taken along lines 2—2 of FIG. 1.
FIG. 3 is a view taken along lines 3—3 of FIG. 1.

With reference to FIGS. 1 and 2, a tool holder 10 is shown for holding a tool or insert 12 for cutting a workpiece W supported conventionally between its ends in a lathe (not shown). The holder 10 has a housing 14 which supports a tool shank 16 with an eccentric ring 18 and a plurality of roller bearings 20 and 22 on either side of the ring 18. The shank 16 can thereby rotate about its central elongated axis X on bearings 20. Furthermore, by rotation of the eccentric ring 18, the shank 16 can be moved in either the Y or Z directions shown, which are orthogonal to the X axis.

The tool shank 16 has a flange 24 at a forward end, upon which is mounted a sensor 26 for sensing various cutting parameters as will be described and for producing electrical output signals proportional to the value of the sensed parameters. A control unit 28 receives the electrical output signals of the sensor 26 via a line 30 and compares these signals with reference signals stored in the control unit 28 and proportional to predetermined desired values of the cutting parameters. In response to these comparisons, the control unit 28 generates output signals on a line 32 that are fed to an actuator 34 which is connected to a rotatable shaft 36. The shank 16 is connected to the shaft 36 to be rotated thereby about the axis X. Actuator 34 may be a reversible digital motor, an electrical rotary stepper or solenoid of any type, or a hydraulic or pneumatic actuator, well known in the art for rotating the shank 16 about the axis X. A similar actuator 39 also responds to output signals from the control unit 28 over a line 40 to rotate the eccentric ring 18, whereby the shank 16 can be moved in the Y or Z direction.

Another sensor 41, which may be a wattmeter, measures the electrical power input for driving the lathe (not shown) and generates an output signal over a line 42 proportional to this parameter. The control unit 28 can store reference signals proportional to predetermined values of electrical power input, compare these to the signals on line 42, and generate output signals on line 32 or line 40 in response to these comparisons. Actuator 34 or actuator 39 responds to these output signals on line 32 or line 40 to rotate the shank 16 or ring 18. The control unit 28 also can generate a control signal on an output line 44 independent of any input signals on line 30 or line 42 to energize the actuator 34 for tool wear sensing purposes and tool life enhancement purposes to be described. The entire tool holder 10 may be mounted on a conventional carriage (not shown) to move the tool 12 into and away from the workpiece W along the X axis to provide a desirable depth of cut, as well as in the Z direction parallel to the axis of rotation $W_Z$ of the workpiece W to feed the tool 12 along the workpiece W.

The cutting tool 12, while only shown generally in the several figures, may be one of any standard lathe cutting tool or insert described in the above-mentioned publication by M. C. Shaw. As initially set up on the shank 16, the tool 12 will provide a particular tool geometry. Before continuing further, it is important to consider more specifically this tool geometry for a fuller understanding of the invention, and to do this, reference will be made to FIGS. 4A and 5A.

Figure 4A:
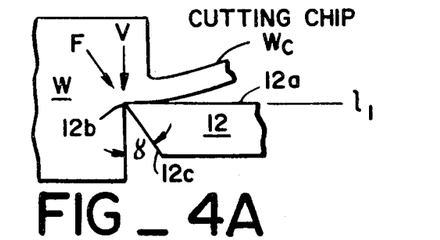
FIGS. 4A, 4B and 4C are views taken along line 4—4 of FIG. 3, showing the manipulation of a cutting tool to perform various machining functions.
Figure 4C:
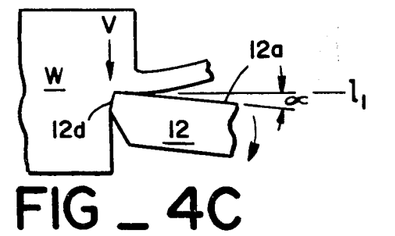
Figure 5A:
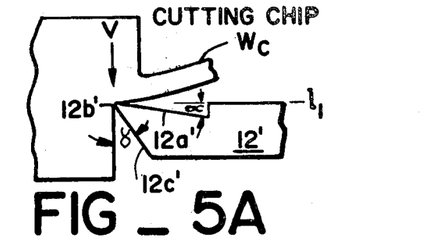
FIGS. 5A, 5B and 5C are view similar to FIGS. 4A–4C, but showing additional manipulations of a different cutting tool to perform other machining functions.

As is known, and as described in the Shaw publication, the tool geometry is determined not only by the shape of the various faces of the tool, but also by the relationship of the tool to a velocity vector V, shown in FIGS. 4A and 5A, which represents the relative movement of the workpiece W with respect to the tool 12. More particularly, in FIG. 4A, the tool 12 is shown as having a surface or face 12a, known as the side rake face. Also shown in the velocity vector V at the cutting tip 12b of the tool 12. The standard lathe tool geometry is designated by a number of angles, one of which is a side rake angle, which is an angle $\alpha$ (see FIG. 4C) between a line $l_1$ perpendicular to the velocity vector V and the side rake face 12a.

In FIG. 4A, the line $l_1$ perpendicular to the velocity vector V is parallel to the side rake face 12a which thus is also perpendicular to the velocity vector V. Consequently, the side rake angle $\alpha$ is 0. In FIG. 5A, which shows a different tool or insert 12′ having a different side rake face 12a′ than the tool 12, the side rake angle $\alpha$ will be greater than 0 since the rake face 12a′ is at an angle with respect to the perpendicular line $l_1$.

As another example, the tool geometry also is specified by a side clearance angle or side relief angle $\gamma$ shown in FIGS. 4A and 5A. The side clearance angle is the angle that a face 12c for tool 12, or 12c′ for tool 12′, makes with the velocity vector V. As indicated in the drawings as one example, faces 12c and 12c′ provide approximately the same angle $\alpha$. Other angles, known as back rake angle and end relief angle can be illustrated similarly. For a further understanding of all the other angles that specify the tool geometry, reference can be made to the above-mentioned Shaw publication.

As can be seen from FIGS. 4A and 5A, if the workpiece W and cutting tool 12 or 12′ retain their same relative positions during the entire machining operation, then the tool geometry will be fixed since, for example, the side rake angle $\alpha$ and side clearance angle $\gamma$ will not change. In current machining practice, the tool 12 or 12′ is fixedly held in a tool holder during the cutting of the workpiece W and the workpiece W is held between its ends so that the velocity vector V will be as shown. Accordingly, in current machining practice, the tool geometry does not change in the process of machining the workpiece W unless, of course, tools having, for example, different rake faces such as 12a or 12a′ are substituted for one another on the holder 10 to cut the workpiece. As already indicated, this might be done to provide different tool geometries for a roughing operation on workpiece W with tool 12 and a finishing operation on workpiece W with tool 12′.

In accordance with the present invention, only a single cutting tool, for example, either tool 12 or 12′, is employed for performing various machining functions, with the cutting tool not in a fixed tool holder, but in a movable tool holder such as holder 10 of FIG. 1 to manipulate or vary the tool geometry as needed or desired. The various functions that can be performed by manipulating or changing the tool geometry have been indicated above generally, but will now be described in more detail.

SENSING TOOL WEAR

With reference again to FIG. 4A, the tool 12 is illustrated as having a sharp cutting tip 12b, which it normally would have during the initial stages of cutting the workpiece W. Also shown is the cutting chip Wc that is produced as a result of the cutting operation.

Figure 4B:
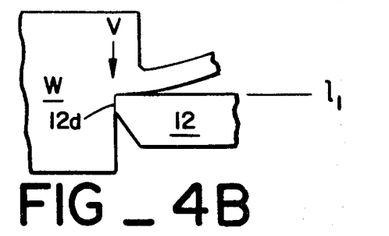

As shown in FIG. 4B, after a certain amount of cutting, the sharpness of the cutting tip 12b will be reduced so that the tool 12 will have a worn flank shown by the surface 12d. Consequently, when this flank 12d is present, the effective side clearance angle $\gamma$ is changed to zero. A certain length of work flank 12d is usually used in the art as the tool life criterion; that is, when the length of the flank 12d is beyond a predetermined amount, the tool 12 would normally be considered not to be suitable for further cutting the workpiece W.

Once the tool wears, in accordance with the invention the cutting tool 12, as shown in FIG. 4C, is purposely rotated a small amount in the clockwise direction around an axis perpendicular to the plane of the drawing and preferably through the cutting tip 12b, to thereby sink the flank 12d into the workpiece W. Consequently, the tool geometry will be varied or changed since both the side rake angle α and side clearance angle γ will vary from their values shown in FIG. 4B. As a result of this rotation of the tool 12, a significant change will occur in the cutting parameters or conditions, such as the cutting force, temperature, and noise, the deflection of the workpiece between its supported ends, and the electrical power intake to the lathe tool machine system, over the FIG. 4B position of tool 12. This change in the cutting parameters is a function of the length of the flank wear 12d, the angle of rotation of tool 12, and other factors.

Figure 6:
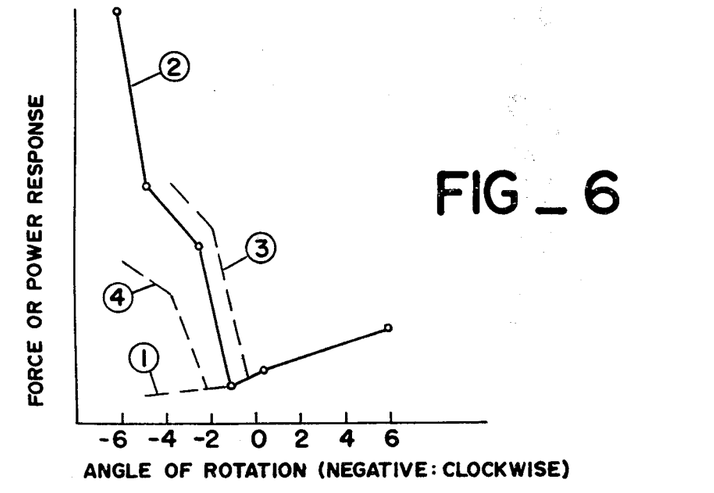
FIG. 6 is a graph useful in explaining the result of manipulating the cutting tool.

FIG. 6 shows the typical relationship between the variables of the cutting force and angle of rotation. Curve 1 in FIG. 4D represents the force-rotation angle relationship for a sharp tool shown in FIG. 4A. As can be determined, a clockwise (negative) rotation of the sharp tool 12 about the above-mentioned perpendicular axis through the tip 12b, at an angle less than the original clearance angle, shown in FIG. 4A, produces a decrease in the side clearance angle γ but an increase in side rake angle α and therefore a decrease in the cutting force. As the flank 12d develops due to wear, as shown in FIG. 4B, the pertinent curve is curve 2 of FIG. 6 showing the force-rotation angle relationship for a flank wear=0.016". Curve 2 shows that the minimum cutting force occurs at a negative rotation angle of about −1.5°. This minimum cutting force will occur at a negative rotation angle with reduced absolute value as the length of the flank 12d increases, as indicated by the curve 3 in FIG. 6 which shows the cutting force-rotatin angle relationship for a flank 12d greater than 0.016 inches. Curve 4 illustrates this relationship for a flank 12d less than 0.016 inches. The same relationship of variables shown in FIG. 6 will exist if the cutting force is replaced by the cutting temperature or electrical cutting power or cutting noise or tool deflection.

It therefore will be seen from FIG. 6 that, after some length of flank 12d develops, by rotating the cutting tool 12 a small angle in a clockwise direction and, hence, changing the tool geometry, the above-mentioned cutting parameters will show different values for different flank lengths. The sensing of these parameters is therefore an indication of the wear of the tool 12. Since these parameters can be relatively easily sensed with well-known sensors such as sensors 26 or 41 which need not be described in detail for an understanding of the invention, system cost can be made relatively low while increasing reliability.

One systematic method for sensing the tool wear is to first begin cutting the workpiece W with the cutting tool 12 as shown in FIG. 4A. At a time interval predetermined by the a lathe operator or automatically determined in-process after the beginning of the cutting operation, the tool 12 may be rotated around the above-mentioned perpendicular axis going through the tip 12b, either manually or automatically, to reduce the side clearance angle γ and increase the side rake angle α of cutting tool 12 by a predetermined degree, i.e., by rotating the cutting tool 12 as indicated in FIG. 4C. Then the new value of the cutting parameter can be sensed and compared with a predetermined reference value proportional to a worn tool 12. If the sensed value is more than the predetermined value, then the cutting operation can be stopped and a new tool 12 having a sharp cutting tip 12b placed in the tool holder 10. Alternatively, as will be described below, the worn cutting tool can continue to be used by rotating the tool 12 in a counter-clockwise direction to increase the clearance angle γ, this being the function of tool life enhancement.

The tool holder 10 of FIG. 1 can be used to carry out the tool geometry manipulation for sensing tool wear. First, the cutting tool 12 will be fixedly placed on the tool shank 16 with its cutting tip 12b being on the axis of rotation X of the shank 16. The entire tool holder 10 will then be moved with the carriage (not shown) along the X axis to bring the tool 12 to cut the workpiece W, which is rotated on the lathe about the workpiece axis $W_Z$, with the workpiece W being cut as shown in FIG. 4A. After a time interval, the actuator 34 can be energized automatically by the control unit 28 generating the control signal on line 44, or manually by the machine operator, to rotate the shaft 36 and hence shank 16 about the axis of rotation X to decrease the side clearance angle γ. Then, as the cutting parameters increase compared with, for example, the case of a sharp tool shown in FIG. 4A, this will be sensed by the sensor 26 or the sensor 41 to produce an output signal proportional to the value of the sensed cutting parameter which is sent to control unit 28. The control unit 28, which has stored the predetermined reference values of the cutting parameter for the sharp tool 12, compares such an output signal with the reference values. If the output signal is greater than these reference values stored in unit 28, the latter can, for example, signal the operator by activating a warnig device (not shown) on the outside of unit 28, such as a light indicating that the tool 12 is worn and should be replaced.

ENHANCING TOOL LIFE

The function of enhancing the life of a cutting tool by manipulating or changing the tool geometry will be discussed in relation to FIGS. 5A, 5B and 5C. FIG. 5A shows the cutting tool 12' during the initial stages of cutting the workpiece W when it has a sharp cutting tip 12b' with a side clearance angle γ. As the machining process continues, the tool 12' will develop the worn flank 12d' resulting in a changed effective clearance angle γ equal to 0. Thus, sliding contact will occur between the tool flank 12d' and the workpiece W resulting in an increase in cutting temperature and, therefore, an accelerated tool wear rate. If the machining operation continues with this sliding contact, the cutting temperature may ride to a point where localized cracks in, or phase transformation of, the tool 12' can occur. This may result in a weakening or softening of the tool. This condition can lead to catastrophic tool failure which may result in damage to the workpiece W thus causing costly scraps.

Figure 5B:
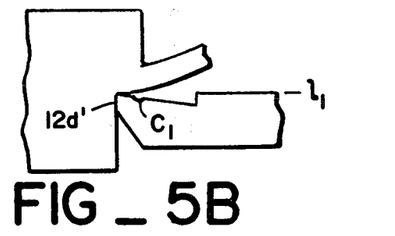
Figure 5C:
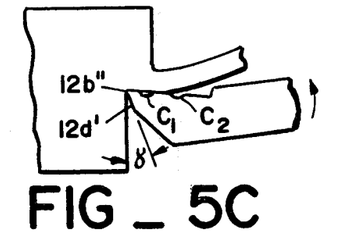

The temperature rise caused by the sliding contact of the worn flank 12d' shown in FIG. 5B is eliminated by releasing this sliding contact and, thereby, increasing the life of the tool 12'. This release of the sliding contact is accomplished by rotating the tool 12' in a counter-clockwise direction shown in FIG. 5C. This counter-clockwise rotation constitutes a change in tool geometry since there will be a decrease in the rake angle α and an increase in the clearance angle γ as may be appreciated by comparing FIGS. 5C and 5B. This counter-clockwise rotation will eliminate the effect, i.e., increased temperature, of the worn flank 12d' by providing a relatively new sharp cutting tip 12b", as shown in FIG. 5C. The same counterclockwise rotation or manipulation of the tool geometry can be accomplished several times during the cutting of the workpiece W and, therefore, the tool life can be significantly prolonged.

The tool holder 10 may be used to manipulate the tool geometry for enhancing the life of the tool or insert 12′. The tool 12′ is first set on the tool shank 16 with its cutting tip 12b′ on the axis of rotation X of the shank 16. Then the tool holder 10 is moved with the carriage (not shown) along the X axis to cut the workpiece W. After a time interval of cutting the workpiece W, the flank 12d′ will develop causing the sliding contact between the tool flank 12d′ and the workpiece W. Then, the tool wear sensing method described in connection with FIGS. 4A–4C can be used to detect this tool wear status. If the tool wear is beyond a predetermined value, instead of or in addition to activating the above mentioned warning device (not shown), the control unit 28 will output a signal on the line 32 to energize the actuator 34 to rotate the tool 12′ in a counterclockwise direction shown in FIG. 5C. Consequently, the tool geometry will change with the side rake angle $\alpha$ being decreased and the side clearance angle $\gamma$ being increased, also resulting in the release of the sliding contact between the flank 12d′ and the workpiece W. If the tool wear is smaller than a predetermined value, the machining process can continue with the relative positions of the workpiece W and tool 12′ as shown in FIG. 5B.

Another form of tool wear is shown n FIG. 5B. This other tool wear is known as crater wear which is a wear created on the rake face 12a′ shown as crater $C_1$. The size and location of the crater $C_1$ is related to the contact conditions between the rake face 12a′ and the cutting chip $W_c$. By manipulating the tool geometry as shown in FIG. 5C, i.e., by changing the rake angle, the tool-chip contact condition will be changed. That is, the crater wear will be formulated on a new location of the rake face 12a′ as represented by a crater $C_2$. By creating a new crater $C_2$, rather than allowing the crater $C_1$ to grow larger, the life of tool 12′ can be enhanced to a significant degree. The tool 12′ can be rotated by the tool holder 10 to produce a new crater $C_2$ by programming the unit 28 to generate control signals on line 44 to energize actuator 34 at scheduled intervals in the machining of the workpiece W.

BORING A WORKPIECE MADE OF MORE THAN ONE MATERIAL

As has been described thus far, the tool geometry has been varied with respect to the workpiece particularly for purposes relating to the tool 12 or 12′; one being to sense the tool wear, the other being to enhance the tool life. As will now be described, the tool geometry will be varied for the purpose of overcoming problems in improving the quality of a finished product from a workpiece. While this discussion will be primarily in relation to machining a workpiece made of more than one material, some of the same problems can be encountered in machining a workpiece made of a single material, and these problems also can be solved by varying the tool geometry.

Figures 7, 8, 9, 10:
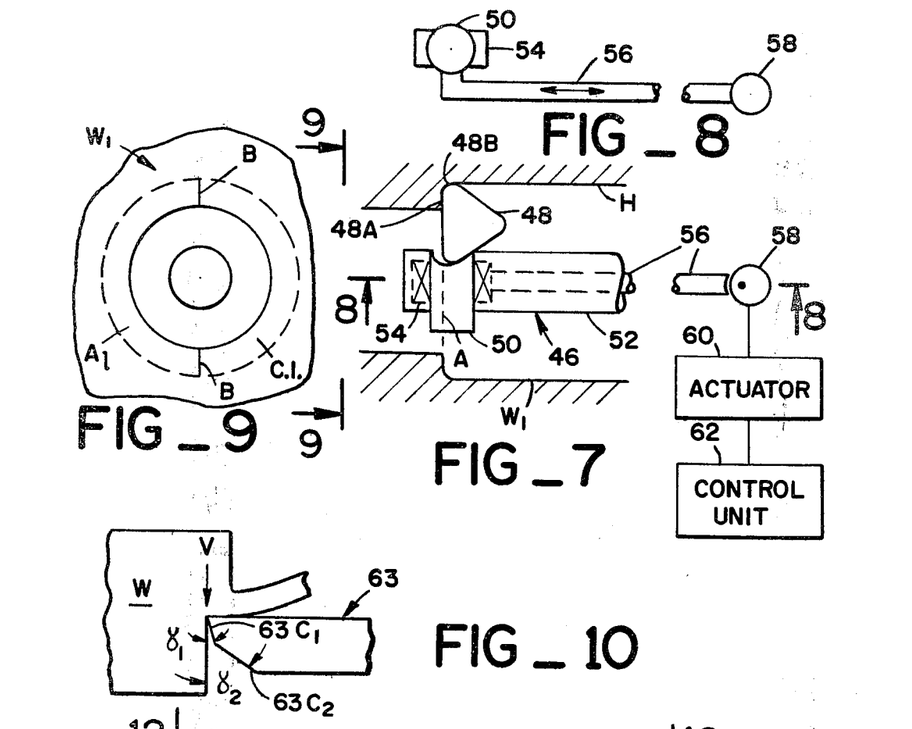
FIG. 7 is a side elevation, partly in section, of another embodiment of apparatus for performing various machining functions.
FIG. 8 is a view taken along lines 8—8 of FIG. 7.
FIG. 9 is a view taken along lines 9—9 of FIG. 7.
FIG. 10 is a view of a different tool design for suppressing chatter.

FIGS. 7–9 show, generally, a tool holder or boring bar 46 having a cutting tool or insert 48 for boring a hole H in a workpiece $W_1$ made of two materials, for example, aluminum $W_{1AL}$ and cast iron $W_{1CI}$ joined at two boundaries B. One problem in boring the workpiece $W_1$ is in the use of the two workpiece materials, each of which, as already noted, requires different optimum cutting tool geometries. Another problem encountered is related to the vibrations which will be induced by impact when the cutting edge 48A of the tool 48 moves across each boundary B from one workpiece material to the other. This impact will cause the tool 48 to vibrate and thus reduce the dimensional accuracy of the bored hole H, i.e., the inside diameter of the hole H will not be uniform due to this vibration. This impact also will place a limit on the machining speed and material removal rate. Furthermore, if the tool 48 is made of a ceramic, the impact may crack the tool 48 and ruin the workpiece $W_1$.

The tool 48 will have a tool geometry with respect to the workpiece $W_1$ similarly as the tool 12 or 12′ with respect to the workpiece W. By controlling the boring of the workpiece $W_1$ made of two different materials, a final product of a precise inside diameter can be achieved. This control is accomplished by manipulating or varying the tool geometry so that (1) the correct tool geometry is used for each material $W_{1AL}$ and $W_{1CI}$, (2) the impact of the tool 48 across the boundaries B is minimized, and (3) a damping effect is increased immediately afte the impact; as a result dimensional accuracy is increased.

The tool 48 is clamped on a suitable tool holder 50 which can rotate about an axis A which extends through the tip 48B of the cutting tool 48. A tool shank 52, which is rotatable about its longitudinal axis by a conventional drive (not shown), rotatably supports the tool holder 50 at the free (unchucked) end of the shank 52 through bearings 54. A rod 56, extending through the shank 52, is connected at one end to the tool holder 50 and at the other end to a rotatable eccentric cam 58 to move axially and hence rotate the holder 50 about its axis A. This other end of the rod 56 therefore acts as a cam follower of the peripheral surface of the cam 58. An actuator 60, similar to actuator 34, can rotate the cam 58 about its axis, while a control unit 62 can be programmed to energize the actuator 60 to change the tool geometry as will now be described.

As the shank 52 is rotated to enable the tool 48 to bore the hole H, when the aluminum part $W_{1AL}$ of the workpiece $W_1$ is being bored, the control unit 62 will energize the actuator 60 to rotate the cam 58 a preset amount. This will cause the rod 56 to rotate the tool holder 50 about the axis A so that the tool 48 also will be rotated to provide the proper tool geometry for boring the aluminum workpiece $W_{1AL}$. When the cast iron part $W_{1CI}$ of the workpiece $W_1$ is to be bored, the control unit 62 will energize the actuator 60 to rotate the cam 58 which will move rod 56 so that the tool holder 50 and hence the tool 48 is rotated about the axis A to provide the proper tool geometry for boring this material.

During and after the time the tool 48 crosses the boundaries B for a revolution of the tool 48, the rake angle $\alpha$ (not shown) of the tool geometry can be increased to reduce the boring cutting forces. This will result in a reduction of the clearance angle $\gamma$ and therefore result in a dampening effect which will reduce the tool vibration generated when the tool 48 crosses the boundaries B. The clearance angle $\gamma$ is reduced by controlling the rotation of the cam 58 so that the rod 56 will appropriately rotate the tool holder 50 and tool 48. Hence, the dimensional accuracy of the hole H can be improved. As may be appreciated, to bore the workpiece $W_1$, the frequency of the change in the tool geometry produced by the control unit 62 periodically energizing the actuator 60 must be synchronized with the relative rotation between the tool 48 and the workpiece $W_1$.

Furthermore, as the shank 52 and hence the tool 48 move axially along the workpiece $W_1$ from one end to the other during the boring process, there may be a tendency for the shank 52 to deflect more and more since the free shank end holding the tool 48 becomes less supported. This would result in non-uniformity of the inside diameter of the hole H being bored as the deflection becomes more pronounced. This non-uniformity can be avoided or at least substantially avoided by moving the rod 56 with the cam 58 under the control of the actuator 60 and control unit 62 to change the tool geometry as the shank 52 moves down the workpiece $W_1$ so that the boring forces are reduced. With this reductin in the boring forces, over the boring forces occurring at the end of the workpiece $W_1$ initially bored, the deflection of the shank 52 can be reduced; therefore, the hole can be bored more uniformly.

SUPPRESSION OF CHATTER

With reference again to FIGS. 1-5, when the cutting tool 12 or 12' moves along and in contact with the workpiece W to machine the workpiece, vibrations may be produced which is known as chatter. It is well known that chatter cannot be eliminated in the machine tool design stage, but is dependent on the individual machine-work-tool system under specific cutting conditions. When chatter is encountered and detected, current machining practice is to suppress it by stopping the machining operation. Chatter, if not prevented or suppressed, would result in the surface of the machined workpiece W being wavy or rippled, with the density of the waves or ripples being the inherent frequency of the vibrations. Furthermore, chatter may reduce tool life. It is also well known that the setup of the machine-work-tool system may result in stable machining when the cutting force is in one direction, but this stability may be off by 10:1 if a cutting force having a different direction is generated when machining the workpiece. Chatter is avoided or suppressed with the present invention by varying the tool geometry to select a desired geometry, such as a particular side clearance angle and side rake angle, or a particular side cutting edge angle (see the Shaw publication). These all influence the direction and magnitude of the cutting force, and the damping of the cutting process. The manner in which the tool holder 10 can change the side rake angle $\alpha$ and side clearance angle $\gamma$ through rotation of the shank 16 has already been described above.

One overall in-process method of suppressing chatter is to begin cutting the workpiece W with the cutting tool 12 supported on the tool holder 10. Then a cutting parameter, e.g., the cutting force, is measured by the sensor 26 to produce output signals on line 30. The control unit 28 will be configured to then determine the variation in cutting force as the tool 12 moves along the workpiece W and compare this variation with a reference signal proportional to a predetermined or in-process determined variation in the cutting force. If the determined variation is larger than the value of the reference signal, the control unit 28 will output a signal on line 32 to energize actuator 34 to rotate the shank 16 and thereby change the tool geometry such as reducing the side clearance angle. Afte this rotation, if there is still a difference between the calculated variation in cutting force and the reference value, then the actuator 34 will continue to be energized to rotate the shank 16 until the cutting force is such that the variation is less than the reference value, or the tool is in such a geometry that cuttig cannot be performed efficiently.

While suppressing chatter has been described in terms of sensing the cutting force, as already indicated another parameter that could be sensed is the deflection of the workpiece W measured from the tool holder 10 to vary the tool geometry should the deflection variation exceed a reference value stored in the control unit 28. The sensor 26 could be a magnetic pick-up device well-known in the art, such as a Bently probe, manufactured by the Bently Nevada Corporation. Alternatively, the deflection of the tool 12 in relation to the housing 14 of the tool holder 10 could be measured with any suitable sensor 26. Other kinds of parameters that might be sensed in order to vary the tool geometry for purposes of chatter control are the cutting temperature, acoustic emissioned cutting, electrical cutting power or tool acceleration, all of which would have reference values representing maximum allowable changes in the cutting parameters as the machining operation continues.

The method of suppressing chatter by varying the tool geometry as described above is applicable when conventional cutting tools such as tools 12 or 12' are used. A clockwise rotation resulting in a smaller clearance angle will reduce chatter. However, it has been found more effective in many cases when a new tool design with a clearance surface other than a single flat surface 12c or 12c' is used. FIG. 10 is an example of this new design of a tool 63. A first clearance face $63c_1$ forms a first clearance angle $\gamma_1$ different from a second clearance angle $\gamma_2$ formed by a second clearance face $63c_2$. The length of face $63c_1$ can be in the order of 0.020". With this arrangement, the first clearance angle $\gamma_1$ can be reduced to a very small value by rotating the tool 63 as described for tool 12 without causing excessive flank rubbing due to the existence of the second clearance angle $\gamma_2$. This will increase the range of rotation to reduce the tool clearance angle to suppress chatter.

ADDITIONAL PARTICULAR DESIGNS OF A CUTTING TOOL OR INSERT FOR MANIPULATING THE TOOL GEOMETRY

Figures 11, 12:
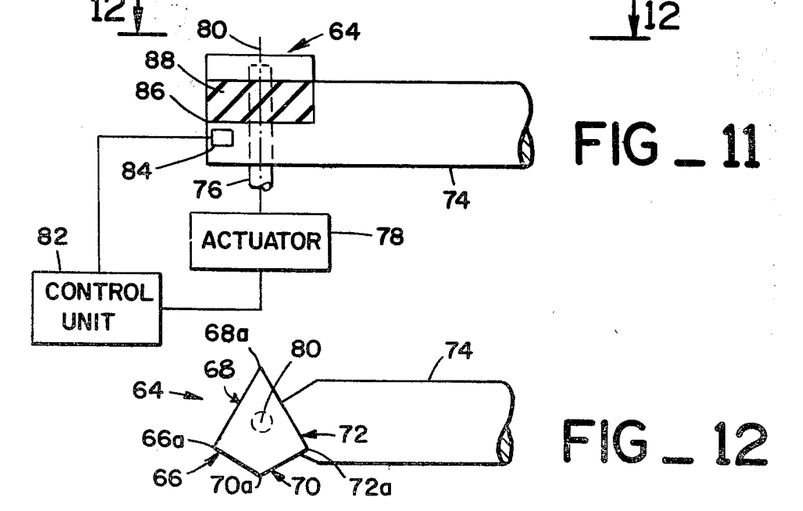
FIG. 11 is a side elevation, partly in section, of yet another embodiment of apparatus for performing various machining functions.
FIG. 12 is a view taken along lines 12—12 of FIG. 11.

Thus far, the invention has been described in terms of a tool holder supporting a single cutting tool such as tool 12 having various faces and a single cutting tip such as tip 12b in which the tool holder is rotated to change the tool geometry. FIGS. 11-12 disclose a single cutting tool. or insert 64 having a plurality of cutting areas 66, 68, 70, 72 for machining the workpiece W. Each of the cutting areas 66, 68, 70, 72 may be considered to be a new or different cutting tool, having a plurality of faces defining the standard lathe tool geometry.

The cutting tool 64 is rotatably supported on a tool shank 74 by a shaft 76 that extends through the shank 74. The shaft 76 is rotatable about its axis 80 by an actuator 78, similar to the actuator 34, which can be operated either manually or automatically through a control unit 82 similar to the unit 28. The shank 74 supports a sensor 84 similar to the sensor 26 to generate signals proportional to a cutting parameter, which are fed to the control unit 82. The cutting tool 64 is coupled to a support 86 on the shank 74 through a relatively soft interface 88 which limits the effect of the impact and/or the effect of any cutting force variation in the machining process.

Each area 66, 68, 70, 72 has a respective cutting tip 66a, 68a, 70a, 72a of the tool 64 on the circumference of a circle C having the shaft axis 80 as its center of rotation. Consequently, when the shaft 76 is rotated about its axis 80 to replace one cutting tip with another cutting tip, for reasons which will be described, substantially the same depth of cut of the workpiece W can be maintained without further adjustment.

One or more of the cutting areas 66, 68, 70, 72 may have their faces manufactured such that the same or a different tool geometry can be provided when a new cutting area is rotated into position for cutting the workpiece. For example, the cutting areas 66 and 68 may have identical faces while the cutting areas 70 and 72 may have faces which are different from each other and from the areas 66 and 68.

As illustrated, the cutting area 66 is in place to cut the workpiece W. The reasons for varying the tool geometry have been described in detail and need not be repeated. If needed, one way of changing the tool geometry if to rotate the shank 74 about any axis, for example, the axis 80. This will rotate the cutting area 66 relative to the workpice W. The tool geometry also could be changed by slightly rotating the shaft 76 with the actuator 78 to, for example, change the side cutting edge angle (not shown).

The tool geometry also can be manipulated by rotating the shaft 76 to move the cutting area 70 into position for cutting the workpiece W thereby replacing the cutting area 66. With the cutting area 70 now machining the workpiece W, a new tool geometry will be provided for purposes already described previously. If the shaft 76 is rotated to replace the cutting area 66 with the cutting area 68 when, for example, the former has worn, there will be no change in tool geometry, but a new sharp cutting tip 68a can be provided in a relatively sort period of time. This will serve as a relatively quick tool changer.

TOOL WEAR COMPENSATION

In machining, a worn tool will cause the workpiece dimension to be larger than that produced by the original sharp tool. The conventional method is to move the tool linearly along the direction that the depth of cut is specified and thereby to compensate the tool wear and maintain the dimensional consistency. In the conventional method, the tool geometry is not changed.

The present invention provides a novel method of compensating the tool wear by including rotating the tool a small amount. This small rotation is done through an axis not going through the tool tip which generates the new workpiece surface.

Figure 13A:
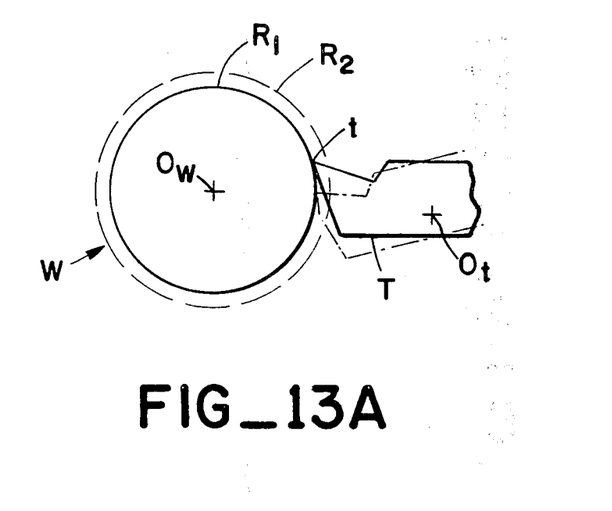
FIG. 13A is a side elevation of a lathe operation used to explain another manipulation of a cutting tool to perform another machining function.
Figure 13B:
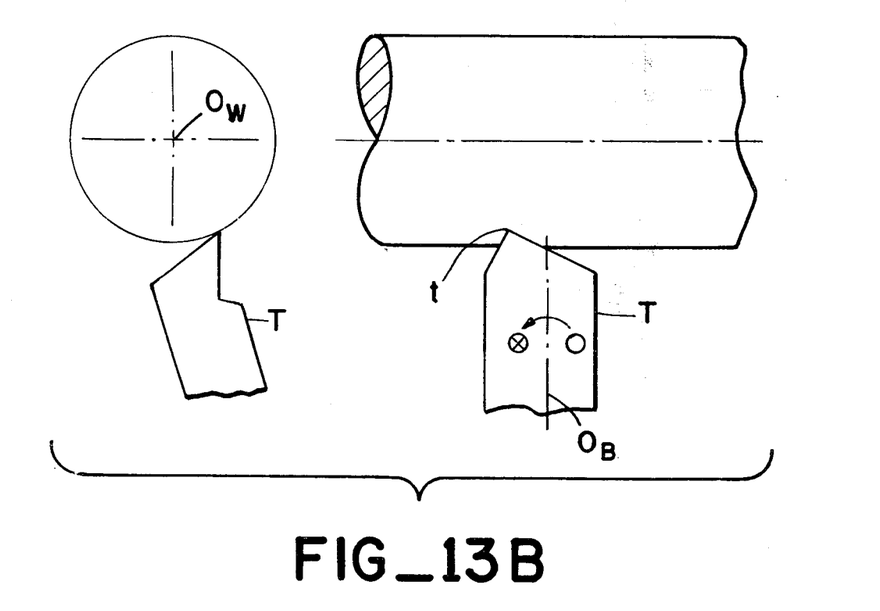
FIG. 13B shows top and side elevation views of a lathe operation used to explain yet another manipulation of a cutting tool to perform the machining function of FIG. 13A.

In other words, the tool wear compensation is achieved by manipulating the tool geometry by rotating the tool, as illustrated by simple cases shown in FIGS. 13A and 13B. In FIG. 13A, circle $R_1$ is the cross section of a lathe workpiece W produced by a sharp tool T, and circle $R_2$ (in dotted line) is that produced by a worn tool. This dimension deviation between $R_1$ and $R_2$ due to tool wear is compensated by rotating the tool T around a proper axis not going through the tool tip t which generates the new surface of the workpiece W. For the purpose of illustration, assume the axis of rotation is perpendicular to the paper and goes through the point $O_t$. Let the tool tip t be set above the horizontal plane going through the axis of rotation $O_w$ of the workpiece W. In this case, the tool wear can be compensated by rotating the tool t counterclockwise by a proper amount, the final position of the tool t being shown in dotted line. FIG. 13B illustrates another possibility for tool wear compensation. The tool T is originally set away from the horizontal plane going through the center of rotation $O_w$ of the workpiece W. The deviation in workpiece radius between $R_1$ and $R_2$ is compensated by rotating the tool T around axis $O_B$ in the direction shown by the arrow so that the surface generating tip t of the worn tool T can be moved to a position in order to generate the right workpiece radius.

MACHINING PROCESS OPTIMIZATION

In machining, it is desirable that the cutting conditions, such as tool geometry, cutting speed, feed, and depth of cut, be selected so that overall optimal performance can be obtained, which can be minimum cost, maximum production rate, maximum workpiece precision, or maximum profit for the machinging process concerned. The selection of cutting conditions should be such that (1) the power requirement is below the maximum power available from the machine tool, (2) the deflection of the machine structure is within the specification, and (3) the process is within a stable region, i.e., no chatter occurs. Since it is difficult to predict the instability region, the cutting conditions are usually set very conservatively to minimize the possibility of machining chatter. This usually very much reduces the productivity of a machine tool.

Furthermore, the change in tool geometry has different effects on machining stability and tool life, which is an important economic consideration. For instance, a larger side cutting edge angle may have a tendency to reduce machining stability and yet to increase tool life in stable turning. Furthermore, a larger side cutting edge angle will reduce the chance of tool tip fracture during the engagement of tool and workpiece.

The control scheme, for example, can be such as to use the largest side cutting edge angle to engage the tool and workpiece, and then use the maximum feasible side cutting edge angle until the need of an adjustment to produce a specific workpiece shoulder. For the rake angle, it is well known that a negative rake can reduce the chance of cutting tip fracture. However, it also increases the tendency of chatter. A smaller clearance angle will reduce the likelihood of chatter and, in the meantime, reduce tool life.

Until the present invention, in practice the art uses a tool with a fixed tool geometry which cannot be changed except after re-setup. The present invention suggests a novel method to provide instantaneously optimal tool geometry, to suppress chatter without affecting production rate by controlling the tool geometry, to sense tool wear and to enhance tool life, all inprocess. The detailed control scheme depends on the type of performance to be optimized. The following control scheme can be used as an example if maximum tool life with fixed production rate is desired.

The control scheme starts with a tool geometry obtained by previous experiments, which maximizes tool life. This tool geometry will be adjusted whenever chatter is encountered according to a chatter suppression scheme discussed above. If no chatter is encountered, the cutting process will proceed and an instantaneous optimal cutting condition, including tool geometry, will be used. The tool wear sensing scheme previously discussed will be used after a pre-specified time interval, which may vary from time to time. If the flank wear of the tool is not excessive, the cutting process goes on. If there is excessive tool flank wear, the tool life enhancement disclosed above will be used. Another control scheme is to pre-program a programmable controller to control the tool geometry in-process.

I claim:

1. A method of machining a workpiece with a cutting tool, comprising:
   (a) placing the tool in a tool holder, the tool then having a tool geometry with respect to the workpiece;
   (b) cutting the workpiece with the tool in the tool holder; and
   (c) varying the tool geometry to sense tool wear.

2. A method according to claim 1 wherein the step of varying comprises:
   (a) rotating the tool to change the rake angle and the clearance angle of the tool geometry; and
   (b) sensing a cutting parameter.

3. A method according to claim 2 wherein the tool has a worn flank and the step of rotating comprises sinking the worn flank into the workpiece to change a cutting parameter.

4. A method according to claim 2 wherein the step of rotating comprises increasing the rake angle and decreasing the clearance angle.

5. A method according to claim 4 wherein the rake angle is the side rake angle and the clearance angle is the side clearance angle.

6. A method according to claim 2 wherein the cutting parameter is one of cutting force, cutting temperature, cutting acoustic emission, machine system electrical power intake, or workpiece deflection.

7. A method of machining a workpiece with a cutting tool, commprising:
   (a) placing the tool in a tool holder, the tool then having a tool geometry with respect to the workpiece;
   (b) cutting the workpiece with the tool in the tool holder; and
   (c) varying the tool geometry to enhance the tool life.

8. A method according to claim 7 wherein the step of varying comprises rotating the tool to change the rake angle and the clearance angle of the tool geometry.

9. A method according to claim 8 wherein the step of rotating comprises decreasing the rake angle and increasing the clearance angle.

10. A method according to claim 9 wherein the rake angle is the side rake angle and the clearance angle is the side clearance angle.

11. A method of machining a workpiece with a cutting tool, comprising:
    (a) placing the tool in a tool holder, the tool then having a tool geometry with respect to the workpiece, the tool geometry including a rake angle and a clearance angle;
    (b) cutting the workpiece with the tool in the tool holder, the tool then having a worn flank; and
    (c) varying the tool geometry to enhance the tool life, including:
       (i) continuing the step of cutting with the worn flank in sliding contact with the workpiece,
       (ii) sensing a cutting parameter during the sliding contact, and
       (iii) decreasing the rake angle and increasing the clearance angle of the tool geometry if the sensed cutting parameter is greater than a preset value.

12. A method according to claim 11 wherein the cutting parameter is one of cutting force, cutting temperature, cutting acoustic emission, machine system electrical power intake or workpiece deflection.

13. A method of machining a workpiece of two contiguous materials with a cutting tool, comprising:
    (a) placing the tool in a tool holder, the tool then having a tool geometry with respect to the workpiece;
    (b) rotating the tool relative to the workpiece;
    (c) cutting each of the materials each revolution with the tool in the tool holder; and
    (d) varying the tool geometry each revolution to cut each material with a proper tool geometry for a respective material.

14. A method according to claim 13 wherein the tool has a tool tip and the step of varying comprises rotating the tool through an axis going through the tool tip to change the rake angle and the clearance angle of the tool geometry when cutting across a boundary between the two materials.

15. A method according to claim 14 wherein the rake angle and the clearance angle are changed to reduce vibration when cutting across the boundary.

16. A method of machining a workpiece with a cutting tool, comprising:
    (a) placing the tool in a tool holder, the tool then having a tool geometry with respect to the workpiece;
    (b) cutting the workpiece with the tool in the tool holder; and
    (c) varying the tool geometry to suppress chatter.

17. A method according to claim 16 wherein the step of varying comprises:
    (a) sensing variation in a cutting parameter during the step of cutting; and
    (b) rotating the tool to change the rake angle and the clearance angle of the tool geometry in response to sensing a predetermined cutting parameter variation.

18. A method according to claim 17 wherein the step of rotating comprises increasing the rake angle and decreasing the clearance angle.

19. A method according to claim 18 wherein the rake angle is the side rake angle and the clearance angle is the side clearance angle.

20. Apparatus for boring a hole in a workpiece with a cutting tool having a cutting tip, the workpiece being made of two different materials, and the tool having a tool geometry with respect to the workpiece, comprising:
    (a) a rotatable tool holder for supporting the tool and having an axis of rotation which extends through the cutting tip;
    (b) a rotatable shaft for rotatably supporting said tool holder and being rotatable about an axis to rotate said tool holder to bore the hole; and
    (c) means for rotating said tool holder about said axis of said tool holder to vary the tool geometry.

21. Apparatus according to claim 20 wherein said means for rotating comprises:
    (a) an elongated axially movable rod having one end connected to said tool holder; and
    (b) an eccentric rotatable cam, said rod having another end following said cam.

22. Apparatus for machining a workpiece, comprising:
    (a) a rotatable cutting tool having a plurality of cutting tips positioned on a circle centered on the axis of rotation of said cutting tool;

(b) a tool holder for supporting said cutting tool; and
(c) means for rotating said tool holder including a shaft connected to said tool and means for rotating said shaft.

23. Apparatus for machining a workpiece, comprising:
(a) a rotatable cutting tool having a plurality of cutting tips positioned on a circle centered on the axis of rotation of said cutting tool;
(b) a tool holder, having elastomer material, for supporting said cutting tool, said elastomer material supporting said tool; and
(c) means for rotating said tool holder, including a shaft connected to said tool and means for rotating said shaft.

24. A method according to claim 8 or claim 17, wherein the cutting tool has a cutting tip which generates the new workpiece surface, and the step of rotating comprises rotating the tool around an axis going through the cutting tip.

25. A method of machining a workpiece with a cutting tool, comprising:
(a) placing the tool in a tool holder, the tool then having a tool geometry with respect to the workpiece;
(b) cutting the workpiece with the tool in the tool holder; and
(c) varying the tool geometry to compensate the dimensional deviation of the workpiece caused by tool wear.

26. A method according to claim 25 wherein the step of varying comprises rotating the cutting tool.

27. A method according to claim 26 wherein the step of rotating comprises rotating the tool around an axis other than an axis going through the tip of the cutting tool.

* * * * *